United States Patent [19]
Schrock et al.

[11] 3,808,676
[45] May 7, 1974

[54] PROCESS OF MANUFACTURING AN ARMATURE-PISTON SUB-ASSEMBLY

[75] Inventors: Martin Omer Schrock, Baltimore; Robert Flohr Burkholder, Towson, both of Md.

[73] Assignee: The Black and Decker Manufacturing Company, Towson, Md.

[22] Filed: Feb. 16, 1973

[21] Appl. No.: 333,018

[52] U.S. Cl. ............ 29/596, 29/446, 310/14, 310/23, 335/261, 335/279
[51] Int. Cl. .......................................... H02k 15/00
[58] Field of Search ........ 29/596, 602, 446; 310/14, 310/17, 23, 30, 34; 335/260, 261, 274, 279

[56] References Cited
UNITED STATES PATENTS

| | | | |
|---|---|---|---|
| 3,617,671 | 11/1971 | Gleeson | 29/622 X |
| 2,682,232 | 6/1954 | Wulff | 29/446 UX |
| 2,433,703 | 12/1947 | Mekelburg | 335/274 X |
| 3,225,159 | 12/1965 | Fluder et al. | 335/261 X |
| 3,062,992 | 11/1962 | Dahl et al. | 385/261 X |

*Primary Examiner*—Charles W. Lanham
*Assistant Examiner*—Carl E. Hall

[57] ABSTRACT

The method of manufacturing an armature-piston sub-assembly adapted to reciprocate within a cylinder of a linear, electric, air compressor or the like. The sub-assembly includes a steel cylindrical shell supported in a cylinder and having one closed end and armature laminations retained in the opposite end. A compression spring is caged between the laminations and the closed end of the shell. Stator laminations surround the sub-assembly and, when energized, move the sub-assembly longitudinally in the cylinder against the spring. The sub-assembly returns under spring force when the stator laminations are de-energized. The inventive method involves forming the cylindrical shell, and assembling the spring means and laminations thereto in a manner minimizing cost and expense and without sacrificing performance or reliability. In addition, the sub-assembly shell may undergo final sizing and finishing after the assembly process to further enhance output and overall performance.

5 Claims, 6 Drawing Figures

PATENTED MAY 7 1974 3,808,676

3,808,676

PROCESS OF MANUFACTURING AN ARMATURE-PISTON SUB-ASSEMBLY

SUMMARY OF THE INVENTION

The subject invention is directed to a novel method of manufacturing an armature-piston sub-assembly for use in a linear, electric device, such as an air compressor or the like. This method includes the steps of forming a cylindrical shell from, for example, drawn steel, locating compression spring means and, if desired, a combination mass and spring seat, against a closed end of the shell, forming intermediate indented means, for example, a groove, in the cylindrical shell near the end opposite the closed end, positioning laminations in the open end of the shell and against the inward formation, and inwardly forming the open end of the shell to retain the laminations in the shell. If desired, an axial dimple can be formed in the closed end of the shell for locating the mass and spring seat, and an end piece can be positioned in the other end of the shell between the laminations and the annular lip. In addition, the steel cylindrical shell can, after assembly of the parts, be centerless ground, coated with a wear resistant material, and sized for accurate dimensional control and low friction. This inventive method minimizes the number of parts required, notably eliminating fasteners, adhesives, and welds, and results in a low cost sub-assembly possessing high strength and durability, as well as reliability and efficiency in performance.

Other objects and advantages of the present invention will become more apparent from a consideration of the detailed description following taken in conjunction with the drawings annexed hereto.

DETAILED DESCRIPTION

Figure 1:
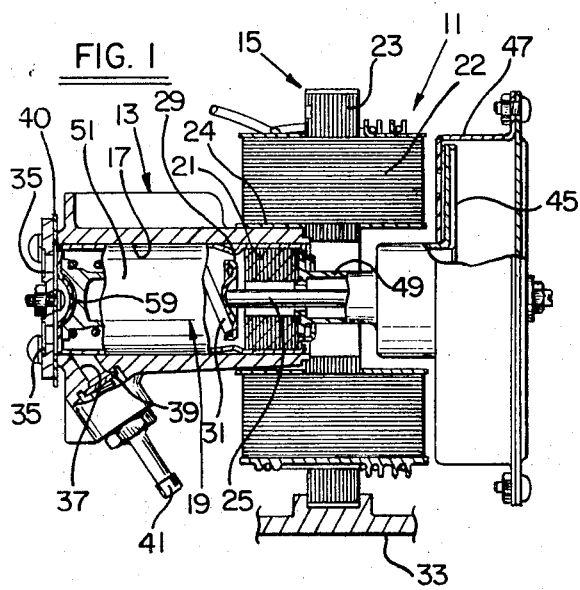
FIG. 1 is a view, partly in section and partly in elevation, showing a linear, electric compressor embodying a piston-armature sub-assembly manufactured in accordance with the present invention.

Referring now specifically to the drawings, a linear, electric, air compressor embodying an armature-piston sub-assembly manufactured in accordance with the present invention is shown generally at 11 in FIG. 1 and is seen to include a casing 33 having a field sub-assembly 15 and a cylinder housing 13 supported therein. The field sub-assembly 15 includes field laminations 23 energized through windings 22 on a spool 24 mounted on the cylinder housing 13.

The cylinder housing 13 includes a cylinder 17 having an armature-piston sub-assembly 19 slidably disposed therein. The piston-armature sub-assembly 19 includes armature laminations 21 which, when field laminations 23 are energized, causes the piston-armature sub-assembly 19 to move in a right-hand direction, as seen in FIG. 1. A rod 25, fixed to a stationary fan housing cover 26, bears against a spring guide 29 engaged by one end of a compression spring 31. The other end of the compression spring 31 is caged within the piston so that when the field laminations 23 are de-energized, the piston-armature sub-assembly 19 is caused to move in a left-hand direction under the force of spring 31. Thus, energizing the field laminations 23 by, for example, rectified alternating current from a conventional A. C. source, results in linear reciprocation of the piston-armature sub-assembly 19.

The housing 13 is provided with inlet and outlet ports 35, 37, respectively, communicating with the cylinder 17. Each of the ports 35, 37 has suitable check valve means 40, 39, respectively, associated therewith so that when the piston-armature sub-assembly 19 moves in a right-hand direction, as seen in FIG. 1, ambient air is drawn into the cylinder 17 through inlet port means 35 (check valve 40 being open), while discharge port means 37 is closed (by check valve means 39). Similarly, when the piston-armature sub-assembly 19 moves in the left-hand direction, as seen in FIG. 1, check valve means 40 closes while check valve means 39 opens causing the air within the cylinder 17 to be discharged through the outlet port 37 and through a coupling 41 adapted for connection to a suitable conduit (not shown).

Conveniently, the construction shown in FIG. 1 can be enclosed within the casing 33 (only part of which is shown). In that case, it may be desirable to provide cooling means for the internal mechanism. Such means may take the form of a linear fan 45 reciprocable in a stationary fan housing 47. The fan 45 has a stem 49 suitably secured to the piston-armature sub-assembly 19 for reciprocation therewith.

Figure 2D:
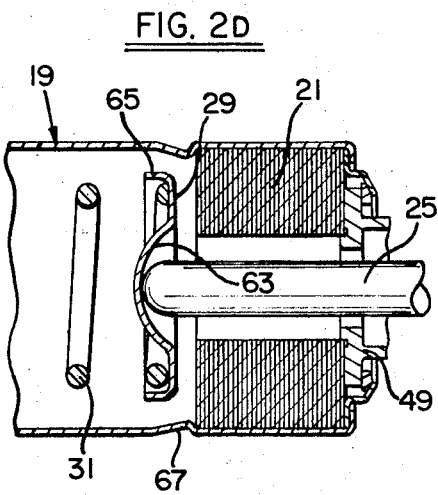
FIG. 2d is an enlarged view of a portion of FIG. 1 showing the armature piston sub-assembly.
Figure 2A:
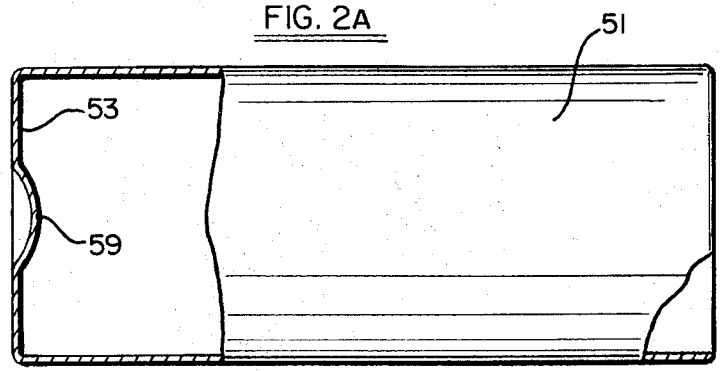
FIG. 2a is an enlarged view, partly in section and partly in elevation, showing the drawn steel cylindrical shell forming the casing for the sub-assembly.
Figure 2B:
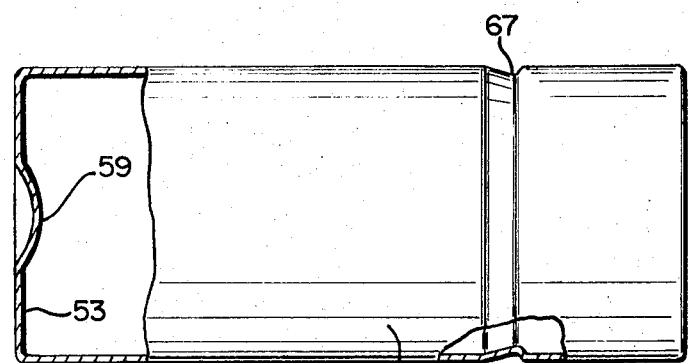
FIG. 2b is a view similar to FIG. 2a and showing the drawn shell after the intermediate annular indented groove has been formed therein.
Figure 2C:
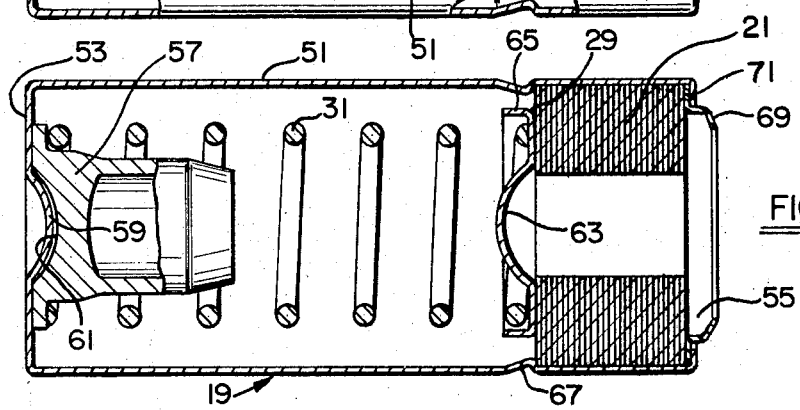
FIG. 2c is a view showing the completed armature piston sub-assembly fabricated in accordance with the present invention.

Turning now specifically to the piston-armature sub-assembly 19, the manufacture of which forms the subject matter of the present invention, it is seen in FIG. 2c to include a hollow, generally cylindrical shell 51 having a closed end 53 and an open end 55. The armature laminations 21 are secured within the open end 55 of the shell 51. The compression spring 31 is located within the shell 51 between the closed end 53 and the laminations 21 and engages spring guide 29 at one end and over a combination mass and spring seat 57 at its other end. The closed end 53 of the shell 51 is provided with an axial dimple 59 generally complementary to a recess 61 formed in the spring seat 57 to locate and retain the latter and spring 31 in position.

The spring guide 29 also is provided with an axial dimple 63 which receives the end of the rod 25. Furthermore, the spring guide 29 is formed with a peripheral skirt 65 within which the compression spring 31 is disposed so that the integrity of the parts is maintained throughout operation of the device.

In accordance with the present invention, the manufacturing steps for the piston-armature sub-assembly 19 results in a construction which is highly efficient and reliable in performance and yet is meritoriously low in cost and easy to manufacture. This sub-assembly is virtually devoid of fasteners, adhesives, and welds which are common in the known prior art, and facilitates a construction which embodies a minimum of parts. Thus, the inventive method is performed first by forming the cylindrical shell 51 from, for example, a drawn steel cup. Conveniently, the axial dimple 59 can be provided in the closed end of this shell 51, as formed, substantially as shown in FIG. 2a. Following this formation, an inward formation, for example, an intermediate annular groove 67 is rolled into the shell 51 at a known axial distance from the closed end 53, resulting in the construction substantially as shown in FIG. 2b. Thereafter, the combination mass and spring seat 57 together with the compression spring 31 and spring guide 29 are dropped into the shell 51, and are followed by the armature laminations 21 which seat against the internal surface of the rolled intermediate groove 67. Finally, an end piece 69 is located against the outer most lamination 21, and the open end 55 of the shell 51 is inwardly formed (rolled over), as shown at 71 to secure the laminations 21 and the end piece 69, as well as the mass and spring seat 57, the compression spring 31, and the spring guide 29 in place within the shell 51. The resulting construction is shown in FIG. 2c.

Figure 3:
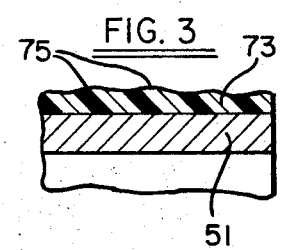
FIG. 3 is an enlarged sectional view showing the drawn cylindrical can with a hardened surface coating thereon.

Desirably, the shell 51 is accurately ground, for example, by centerless grinding, and its outer, cylindrical surface is coated with a wear resistant, low friction material 73 (FIG. 3), for example, Xylan 1010, a product of Whitford Corporation of West Chester, Pa. Following this, the sub-assembly may be sized by means of a sizing die to control the accuracy of its external dimensions and to eliminate high spots 75 formed by the coating 73 to thereby control leakage during use without requiring expanding piston rings. The sub-assembly 19 is then ready for assembly to the compressor 11.

It will be appreciated that the manufacturing method recited above results in a relatively simple, inexpensive, armature-piston construction wherein the single, one-piece cylindrical shell 51 functions as a piston and contains the armature laminations 21. Furthermore, it is apparent that the armature laminations together with the mass 57, spring 31, etc., are secured in place in this sub-assembly without the need for any separate fasteners, adhesives, or welds, this having obvious meritorious implications as to cost and size.

By the foregoing, there has been disclosed a novel method of manufacturing a piston-armature sub-assembly for use in a linear, electric device, this method being calculated to fulfill the inventive objects and advantages hereinabove set forth. However, while a preferred form of the invention has been illustrated and described above in detail, various additions, substitutions, modifications and omissions may be made thereto without departing from the spirit of the invention.

We claim:

1. The method of manufacturing an armature-piston sub-assembly and mounting it in a linear, electric device which includes a cylinder, field laminations, and windings, comprising the steps of forming a cylindrical shell having a substantially closed end and a substantially open end, forming an annular indented groove in said shell intermediate its ends, positioning a compression spring in said shell, positioning armature laminations in said shell against said annular groove, rolling said substantially open end of said shell over to trap said armature laminations and retain said spring therewithin, and mounting said sub-assembly including said shell, compression spring, and armature laminations in said linear, electric device by placing said cylindrical shell in said cylinder and positioning said armature laminations adjacent said field laminations.

2. The method of manufacturing an armature-piston sub-assembly and mounting it in a linear electric device which includes a cylinder, field laminations, and windings, comprising the steps of drawing a substantially cylindrical shell having a dimpled closed end and an open end, inwardly forming a portion of said shell intermediate said ends, positioning a mass and spring seat in said shell and located on said dimpled end, positioning a compression spring over said mass and spring seat, positioning armature laminations in said shell against said inward formation to trap said spring and said mass and spring seat, inwardly forming the open end of said shell over said armature laminations, and mounting the sub-assembly including the shell, mass, spring seat, and armature laminations in said linear, electric device by placing said cylindrical shell in said cylinder and positioning said armature laminations adjacent said field laminations.

3. The method of manufacturing an armature-piston sub-assembly and mounting it in a linear, electric device which includes a cylinder, field laminations, and windings, comprising the steps of forming a substantially cylindrical shell of sheet metal having an inwardly extending radial wall at one end, an inwardly formed intermediate portion, and an open end, positioning a compression spring in said shell against said radial wall, positioning armature laminations in said shell against said inward formation to trap said spring within said shell, inwardly forming the open end of said shell over said armature laminations, sizing the outer peripheral surface of said shell, and mounting said sub-assembly including said shell, compression spring, and armature laminations in said linear, electric device by placing said cylindrical shell in said cylinder and positioning said armature laminations adjacent said field laminations.

4. The method of manufacturing an armature-piston sub-assembly and mounting it in a linear, electric device which includes a cylinder, field laminations, and windings, comprising the steps of forming a hollow, substantially cylindrical shell of sheet metal having an inner wall, an open end, and an inward formation intermediate said open end and another end of said shell, positioning a compression spring and armature laminations within said shell, the armature laminations engaging the wall of said shell and inward formation to limit the axial positioning of said armature laminations with respect to said open end, inwardly forming said open end to retain said armature laminations in place within said shell, grinding the outer peripheral surface of said shell, coating said ground outer shell surface with a hard, low friction material, sizing said hard coating for accurate dimensional control thereof, and mounting said sub-assembly including said shell, compression spring, and armature laminations in said linear, electric device by placing said shell in said cylinder and positioning said armature laminations adjacent said field laminations.

5. The method of manufacturing an armature-piston sub-assembly and mounting it in a linear, electric device which includes a cylinder, field laminations, and windings, comprising the steps of draw forming a substantially cylindrical shell having a dimpled closed end and an open end, inwardly forming a peripheral groove in said shell, positioning a mass and spring seat in said shell against said dimpled end, positioning a compression spring over said mass and spring seat, positioning armature laminations in said shell against said inward formation to trap said spring in said mass and spring seat within said shell, forming the open end of said shell over said armature laminations, grinding the peripheral surface of said shell, coating said peripheral surface of said shell with a relatively hard, low friction material, sizing said coating for accurate formation, and mounting said sub-assembly, including said shell, mass, spring seat, compression spring, and armature laminations, in said linear, electric device by placing said shell in said cylinder and positioning said armature laminations adjacent said field laminations.

* * * * *